Aug. 5, 1969  V. H. BURWINKLE ETAL  3,459,162
FUEL MIXER HEATERS FOR INTERNAL COMBUSTION ENGINES
Filed June 2, 1967

INVENTORS.
VINCENT H. BURWINKLE
RAYMOND D. ELMORE
BY Corey & Corey
ATTORNEYS.

3,459,162
FUEL MIXER HEATERS FOR INTERNAL COMBUSTION ENGINES

Vincent H. Burwinkle, 827 5th Ave. SE., Cedar Rapids, Iowa 52403, and Raymond D. Elmore, 4411 Lee NE., Cedar Rapids, Iowa 52402
Filed June 2, 1967, Ser. No. 643,181
Int. Cl. F02m 29/04, 31/18
U.S. Cl. 123—122    4 Claims

ABSTRACT OF THE DISCLOSURE

A mixer-heater for improving vaporization of the intake mixture of an internal combustion engine, consisting of three stacked aluminum plates positioned across the intake passageway between the carburetor outlet and inlet end of the manifold, the plates having registered small openings therethrough for breaking up the droplets of gasoline and a tortuous channel in the middle plate passing among the openings for introducing heat to the plates and thus the mixture.

---

A mixer consisting of at least three plates with portions of the outer plates blanked off and the middle plate cut away to provide a passageway for heating the gas at the same time.

In internal combustion engines it is of course very important that the incoming gas be completely mixed and vaporized and, if possible, it is desirable for heat to be introduced at the point where mixing occurs.

An object of our invention is to completely vaporize and heat the incoming gas mixture for an internal combustion engine in order to secure maximum combustion and therefore maximum mileage of the vehicle the engine drives.

Another object of our invention is to provide a combination mixer-heater which can be readily inserted in the manifold between the intake manifold and the carburetor of an internal combustion engine.

Another object of our invention is to provide a relatively inexpensive device of the above character which will increase the performance of an internal combustion engine by completely vaporizing and heating the gas.

Figure 1:
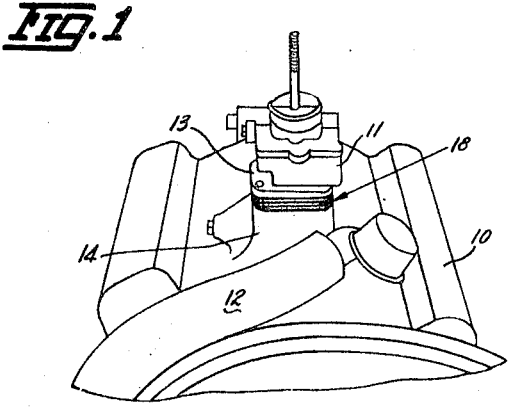
FIGURE 1 is a view in perspective of the broken-away illustration of the top of an internal combustion engine, with our mixer-heater in place.

Referring now to the drawings:

A broken-away portion of an internal combustion engine is illustrated at 10 with the carburetor illustrated at 11. The air cleaner normally mounted on top of the carburetor has been removed for better illustration.

Most carburetors are mounted on the intake manifold 12 as shown, the carburetor here shown being of the down-draft type, and in the present instance a two-barrel carburetor is shown, so that there are two passageways for the air-gas mixture.

The carburetor is usually provided with a flange at 13 and this mates with a like flange at 14 on the intake manifold 12.

Figure 2:
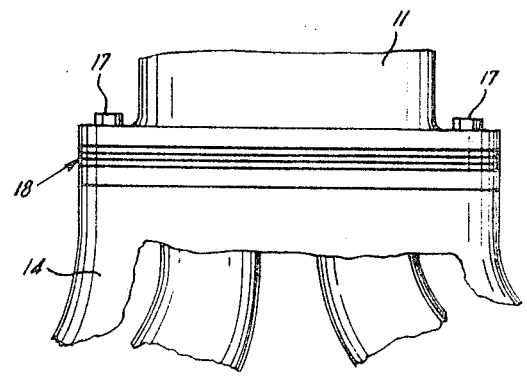
FIGURE 2 is an enlarged elevational view of the junction of the carburetor and the intake manifold, showing our mixer-heater in place.

Ordinarily an asbestos copper gasket would be supplied between the flanges 13 and 14 and the flanges held together by bolts 17, but a mixer-heater 18 constructed according to one embodiment of our invention and shown in FIGURE 2 is substituted for the gasket, only slightly increasing the spacing between the flanges.

A preferred form of our mixer-heater is shown in stacked relation in FIGURES 1 and 2, and the three plates which constitute the preferred form are shown in FIGURES 3 to 6.

Figure 3:
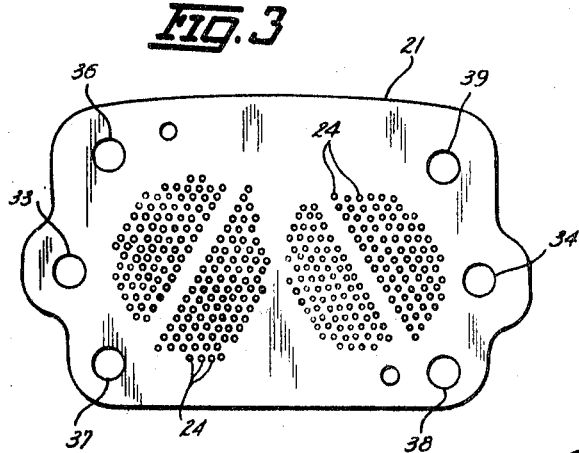
FIGURE 3 is a plan view of the uppermost of the stack of three plates.
Figure 6:
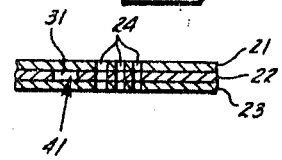
FIGURE 6 is a fragmentary view illustrating how the channels for heating are located adjacent the openings in the plates and how the two outside plates are formed.
Figure 4:
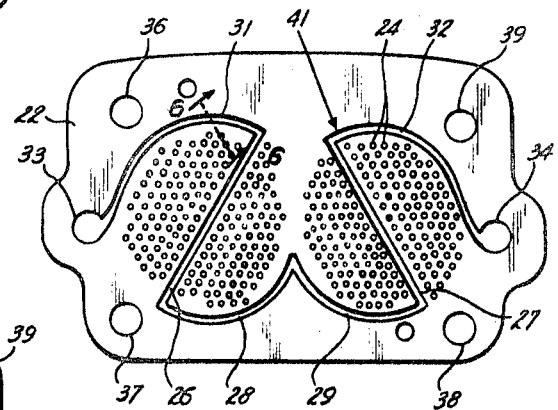
FIGURE 4 is a plan view of the middle of the three plates, illustrating the heating channel.
Figure 5:
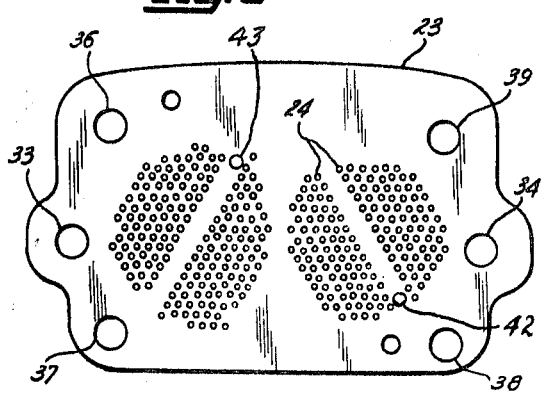
FIGURE 5 is a plan view of the bottom of the three plates.

The top plate 21 is shown in FIGURE 3, the middle plate 22 in FIGURE 4, and the lower plate 23 in FIGURE 5. The plates 21 and 23 are identical so far as the small mixing holes 24 in the plates are concerned. In fact, in making the plate, the plates 21, 22 and 23 may be stacked together and the small holes 24 drilled or punched through all three plates at the same time.

The pattern of the holes in the three plates correspond to the two "barrels" or passageways in the carburetor and intake manifold, and it is the dividing and mixing effect of these small openings which mixes and vaporizes the gas-air mixture.

It is to be noted that in plates 21 and 23, the openings in both patterns of holes are blind in one row of each of the two sets of openings, and that in this instance the bland row or strip, formed by omitting a row of holes, are inclined with relation to one another.

In plate 22, shown in FIGURE 3, slots 26 and 27 have been routed or milled in the blank strips. The straight slots 26 and 27 are formed by two curved slots 28 and 29, the curved portions of the slots being near but not communicating with the mixing holes 24.

The other ends of slots 26 and 27 are connected with another set of curved slots 31 and 32, and these slots are connected to holes 33 and 34, which holes communicate with passageways usually present in the intake manifold and mounting flange of the carburetor. The passageways referred to communicate by tubing or passageways associated with the exhaust manifold or are so positioned as to be heated by the exhaust manifold. If the passageways are not present, it may be necessary to drill them. Thus heat is conducted to the center plate duct by opening 33, passes through the slots or heat duct, and out through the other opening 34, the latter opening being connected with the inside of the manifold. The openings 36 are for the bolts 17 which clamp the carburetor to the intake manifold. Openings 39 are for alignment purposes.

Note that the heat duct conduit or passageway 41 formed by the slots is in only the center plate, and thus the blanked portion of the other two plates form the walls of the heat slot or conduit. We may provide openings such as 42 and 43 leading through the bottom plate to promote movement of the hot gas in the heat duct. The plates are preferably of aluminum so that heat from the heat duct passes readily by conduction to the edges of the small mixer holes.

Obviously many modifications of our invention may be made by those skilled in the art. The pattern of the mixer openings may be changed to accommodate single barrel or 4-barrel carburetors. The heat duct may be modified from the W-shape or double-Z shape here shown. These and other modifications may be made without departing from the spirit and scope of our invention.

We claim as our invention:

1. In a mixer for internal combustion engines having exhaust systems, means for breaking up the droplets of gasoline including at least three stacked plates inserted in the intake manifold passageway between the carburetor mounting flange and the inlet to the intake manifold, the plates being in contact with each other and each having a plurality of foraminations therethrough, and such foraminations being continuous and registering with each other, a heat passageway provided in the middle plate between but not communicating with the foraminations, the other two plates providing walls of the passageway, and means for supplying heat to the passageway from the engine exhaust system.

2. In a device as set forth in claim 1, the foraminations through the three plates being of the same diameter and forming continuous passageways.

3. In a mixer as set forth in claim 1, the plates having a double set of foraminations as for a two-barrel carburetor and the form of the passageway being in a double Z form to supply the greatest heating effect, the flange of the carburetor being provided with openings therein and conduits connected to the openings and to the engine exhaust system.

4. In a mixer as set forth in claim 1, an opening in the bottom plate connected with the heat passageway in the middle plate to promote the flow of heated air through the heat passageway in the middle plate.

References Cited

UNITED STATES PATENTS

| 1,568,642 | 1/1926 | Thompson. | |
|---|---|---|---|
| 2,257,047 | 9/1941 | Finestone. | |
| 2,362,163 | 11/1944 | Shipman | 261—153 X |
| 2,925,257 | 2/1960 | Cohn | 261—145 |
| 3,088,447 | 5/1963 | Henderson. | |
| 1,382,285 | 6/1921 | Harris. | |
| 2,300,774 | 11/1942 | Cartmell. | |

FOREIGN PATENTS

| 240,619 | 6/1960 | Australia. |
|---|---|---|
| 819,509 | 7/1937 | France. |
| 192,311 | 2/1923 | Great Britain. |

AL LAWRENCE SMITH, Primary Examiner

U.S. Cl. X.R.

123—119, 141; 261—145